US012526593B1

(12) United States Patent
Miller et al.

(10) Patent No.: US 12,526,593 B1
(45) Date of Patent: Jan. 13, 2026

(54) ESTIMATION OF HEARING LOSS OF A USER FROM INTERACTIONS WITH A LOCAL ENVIRONMENT BY THE USER IDENTIFIED FROM CAPTURED AUDIO AND INFORMATION DESCRIBING THE LOCAL AREA

(71) Applicant: Meta Platforms Technologies, LLC, Menlo Park, CA (US)

(72) Inventors: Christi Miller, Seattle, WA (US); Sara Ng, Seattle, WA (US); Calvin Murdock, Seattle, WA (US); Nils Thomas Fritiof Lunner, Redmond, WA (US); William Owen Brimijoin, II, Kirkland, WA (US); Vamsi Krishna Ithapu, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 274 days.

(21) Appl. No.: 18/305,635

(22) Filed: Apr. 24, 2023

Related U.S. Application Data

(60) Provisional application No. 63/434,769, filed on Dec. 22, 2022, provisional application No. 63/334,170, filed on Apr. 24, 2022.

(51) Int. Cl.
 *H04R 25/00* (2006.01)
(52) U.S. Cl.
 CPC ......... *H04R 25/70* (2013.01); *H04R 2225/41* (2013.01)
(58) Field of Classification Search
 CPC ........................... H04R 25/70; H04R 2225/41; H04R 2225/81; H04R 2225/83
 (Continued)

(56) References Cited

U.S. PATENT DOCUMENTS 8,204,751 B1  6/2012 Di Fabbrizio et al.
9,043,204 B2  5/2015 Berens
(Continued)

FOREIGN PATENT DOCUMENTS

CN     204336923 U   5/2015
EP         1236433 B1  11/2006
WO   WO-2018101589 A1   6/2018

OTHER PUBLICATIONS

Public Health, "Table 4: World Health Organisation Grades of Hearing Impairement (WHO, 2008)," 2008 [Retrieved on Apr. 7, 2022], 1 page, Retrieved from the Internet: URL: https://ec.europa.eu/health/scientific_committees/opinions_layman/en/hearing-loss-personal-music-player-mp3/figtableboxes/table-4.htm.
(Continued)

*Primary Examiner* — Angelica M McKinney
(74) *Attorney, Agent, or Firm* — Greenberg Traurig, LLP

(57) ABSTRACT

An audio system includes one or more acoustic sensors capturing audio from a local area surrounding the audio system and one or more additional sensors capturing data describing the local area. An audio controller in the audio system identifies interactions by a user based on the captured audio and the data describing the local area. The audio controller determines attributes associated with each interaction, such as metrics describing speaking by the user, metrics describing requests for clarification by the user, and metrics based on a topic determined from audio captured by the user. Based on the interactions and associated attributes, the audio controller estimates a sound profile for the user that identifies ranges of frequencies where the user has hearing loss. The audio controller may leverage the sound profile to determine one or more filters to offset hearing loss of the user.

20 Claims, 6 Drawing Sheets

(58) Field of Classification Search
 USPC .......................................................... 381/56
 See application file for complete search history.

(56) References Cited

U.S. PATENT DOCUMENTS

| | | | |
|---|---|---|---|
| 9,293,134 | B1 | 3/2016 | Saleem et al. |
| 11,170,761 | B2 | 11/2021 | Thomson et al. |
| 2010/0030101 | A1 | 2/2010 | Durrant et al. |
| 2012/0283594 | A1 | 11/2012 | Uhlén et al. |
| 2016/0119726 | A1 | 4/2016 | Pontoppidan et al. |
| 2018/0268813 | A1 | 9/2018 | Georges et al. |
| 2019/0261102 | A1* | 8/2019 | Foo ........................ H04R 25/50 |
| 2020/0382859 | A1* | 12/2020 | Woodruff ............. H03G 3/3005 |
| 2020/0387341 | A1 | 12/2020 | Robinson et al. |
| 2022/0021972 | A1 | 1/2022 | Brimijoin, II et al. |
| 2022/0070604 | A1 | 3/2022 | Campbell et al. |

OTHER PUBLICATIONS

Wu J., et al., "Scratch That: Supporting Command-Agnostic Speech Repair in Voice-Driven Assistants," Proceedings of the ACM on Interactive, Mobile, Wearable and Ubiquitous Technologies, Jun. 21, 2019, vol. 03, No. 02, 17 pages.
International Preliminary Report on Patentability for International Application No. PCT/US2023/084616, mailed Jul. 3, 2025, 7 pages.
International Search Report and Written Opinion for International Application No. PCT/US2023/084616, mailed May 7, 2024, 11 pages.

* cited by examiner

300

Capture, from One or More Sensors, Information Describing a User, Information Describing a Local Area, or Some Combination Thereof
310

Identify One or More Interactions with Local Area by User from Captured Audio and Information Describing Local Area
315

Estimate Sound Profile of User from Identified Interactions
320

Determine One or More Filters to Apply to Audio Based on Sound Profile
325

Generate Augmented Audio by Applying One or More Filters to Audio
330

Present Augmented Audio to User
335

FIG. 3

ESTIMATION OF HEARING LOSS OF A USER FROM INTERACTIONS WITH A LOCAL ENVIRONMENT BY THE USER IDENTIFIED FROM CAPTURED AUDIO AND INFORMATION DESCRIBING THE LOCAL AREA

CROSS-REFERENCE TO RELATED APPLICATIONS

This application claims the benefit of U.S. Provisional Application No. 63/334,170, filed Apr. 24, 2022, and of U.S. Provisional No. 63/434,769, filed Dec. 22, 2022, each of which is incorporated by reference in its entirety.

FIELD OF THE INVENTION

This disclosure relates generally to mitigating hearing loss, and more specifically to estimating hearing loss of a user and mitigating hearing loss for the user.

BACKGROUND

While mild to moderate hearing loss affects a significant number of individuals, conventional diagnosis of such hearing loss in an individual requires the individual visit a clinical provider, such as an audiologist. The clinical provider performs a hearing test to estimate an audiogram describing the individual's hearing for different frequencies, and may have the individual fill out a series of survey questions. The clinical provider may also measure the individual's intelligibility and listening effort when listening to speech with different levels of background audio. Based on the individual's audiogram, answers to the survey questions, and results of the speech and effort measurements, the clinical provider estimates hearing loss of the individual, as well as effects of the estimated hearing loss on the individual. However, sitting for hearing tests and filling out a survey are time-consuming for the individual being evaluated. Further, a hearing test and/or survey provides limited data about an individual's hearing, preventing either process from providing a complete assessment of the individual's functional hearing. This limited assessment of the individual's functional hearing limits the ability of conventional methods to accurately estimate the individual's hearing loss and to compensate for the individual's hearing loss.

SUMMARY

To estimate a user's hearing loss, a controller may receive data captured by one or more sensors including information describing a user and information describing a local area. The controller for receives data captured by various sensors and analyzes the received data to generate a sound profile for the user. In various embodiments, the controller is a component of a headset that may be used in artificial reality contexts. The controller and the user are in a local area, such as a room, that surrounds the controller and the user. One or more acoustic sensors are coupled to the controller and capture audio within the local area. One or more additional sensors are also coupled to the headset, with the additional sensors capturing information the user and/or information describing the local area. For example, information describing the user may include head motion, eye tracking, facial expression, biometric data, other data characterizing the user, or some combination thereof. To capture the head motion, for example, a position sensor may be implemented to track a position and/or movement of the headset, and/or an imaging device may capture image data of the local area to localize the headset relative to the local area. To capture eye-tracking information and/or facial expressions, an imaging device may be disposed on the headset facing inwardly towards a user's face to capture image data of the user's face. The controller may analyze the image data to determine eye-tracking information, facial expressions, or some combination thereof. Other example biometric sensors include a heart sensor, a blood pressure sensor, a blood oxygen level sensor, an electroencephalogram sensor, a blood glucose monitor, other sensors capable of measuring biometric data of the user. Information describing the local area may include image data, audio data, other data characterizing the local area. For example, an additional sensor is an imaging device capturing video or images of the local area. As another example, an additional sensor is a position sensor capturing a location or movement of the headset or a user in the local area.

In one or more embodiments, a controller may utilize captured audio data of a user to determine a sound profile for the user. In such embodiments, the controller may be a component of an audio system, e.g., an audio controller. The controller may further utilize other information describing the user, information describing the local area, or some combination thereof to determine the sound profile. From the captured audio and any other information that may be incorporated, the controller identifies one or more interactions by the user with the local area. An interaction by the user is a response by the user to a stimulus in the local area. For example, an interaction is movement of the user (e.g., a gesture by the user) or generation of audio by the user. Additionally, the controller determines one or more attributes associated with an identified interaction. The attributes may describe speech or movement of the user during an interaction (e.g., asking for repetition; moving closer to the sound source) or may identify conditions (e.g., background noise, location of a sound source relative to the audio controller) in the local area during the interaction. Based on one or more identified interactions and attributes associated with the one or more identified interactions, the controller estimates a sound profile for the user. The sound profile describes a level of hearing loss of the user and a configuration of the hearing loss for the user, such as identifying ranges of frequencies where the user's hearing is impaired. In various embodiments, the controller applies a trained model to one or more identified interactions and their attributes to estimate the sound profile of the user.

In one or more embodiments, the controller may utilize eye-tracking information of a user to determine a sound profile for the user. In such embodiments, the controller may be a component of an eye-tracking system comprising the controller and one or more imaging devices. The controller may further utilize other information describing the user, information describing the local area, or some combination thereof to determine the sound profile.

In one or more embodiments, the controller may utilize facial expression information of a user to determine a sound profile for the user. In such embodiments, the controller may be a component of a face-tracking system comprising the controller and one or more imaging devices inwardly disposed with a user's face in the field of view. The controller may further utilize other information describing the user, information describing the local area, or some combination thereof to determine the sound profile.

In some embodiments, the controller compensates for hearing loss of the user identified by the sound profile. Based on the sound profile, the controller determines one or more filters configured to counteract one or more effects of the hearing loss. For example, one determined filter increases amplitude of audio having frequencies within a range of frequencies where the sound profile indicates the user has hearing loss. The controller applies the one or more filters to audio, generating augmented audio. Continuing the above example, in the augmented audio, audio in ranges of frequencies where the sound profile indicates hearing loss for the user is amplified relative to other frequencies. The augmented audio is presented to the user via one or more transducers, such as speakers, to increase a likelihood of the user understanding the augmented audio relative to the audio without application of the one or more filters.

In various embodiments, one or more acoustic sensors capture audio from a local area surrounding an audio controller. One or more additional sensors capture information describing the local area. Examples of information describing the local area include video of the local area, movement of the user in the local area, a level of background noise in the local area, or other data describing conditions in the local area. The audio controller identifies one or more interactions with the local area by the user based on the captured audio, video, head tracking, and eye tracking, and the information describing the local area, and estimates a sound profile of the user from the identified one or more interactions and attributes associated with the one or more interactions. The sound profile identifies hearing loss of the user for one or more ranges of frequencies.

In some embodiments, a computer program product comprises a non-transitory computer-readable storage medium having instructions encoded thereon that, when executed by a processor, cause the processor to capture audio from a local area surrounding an audio controller using one or more acoustic sensors and to capture information describing the local area from one or more additional sensors. Additionally, when executed, the instructions cause the processor to identify, by the audio controller, one or more interactions with the local area by a user based on the captured audio and the information describing the local area. Execution of the instructions causes the processor to estimate a sound profile of the user from the identified one or more interactions and attributes associated with the one or more interactions, where the sound profile identifying hearing loss of the user for one or more ranges of frequencies.

In some embodiments, a headset comprises one or more display elements are coupled to a frame, each display element is configured to generate image light presented to a user. The headset also includes one or more acoustic sensors configured to capture audio from a local area surrounding the headset and one or more additional sensors configured to capture information describing the local area surrounding the headset. The headset also includes an audio controller having a processor and a non-transitory computer readable storage medium having instructions encoded thereon that, when executed by the processor, cause the processor to identify, by the audio controller, one or more interactions with the local area by a user based on the captured audio and the information describing the local area and to estimate a sound profile of the user from the identified one or more interactions and attributes associated with the one or more interactions, where the sound profile identifies hearing loss of the user for one or more ranges of frequencies.

BRIEF DESCRIPTION OF THE DRAWINGS

FIG. 3 is a flowchart illustrating a method for estimating hearing loss of a user of a headset, in accordance with one or more embodiments.

Figure 1A:
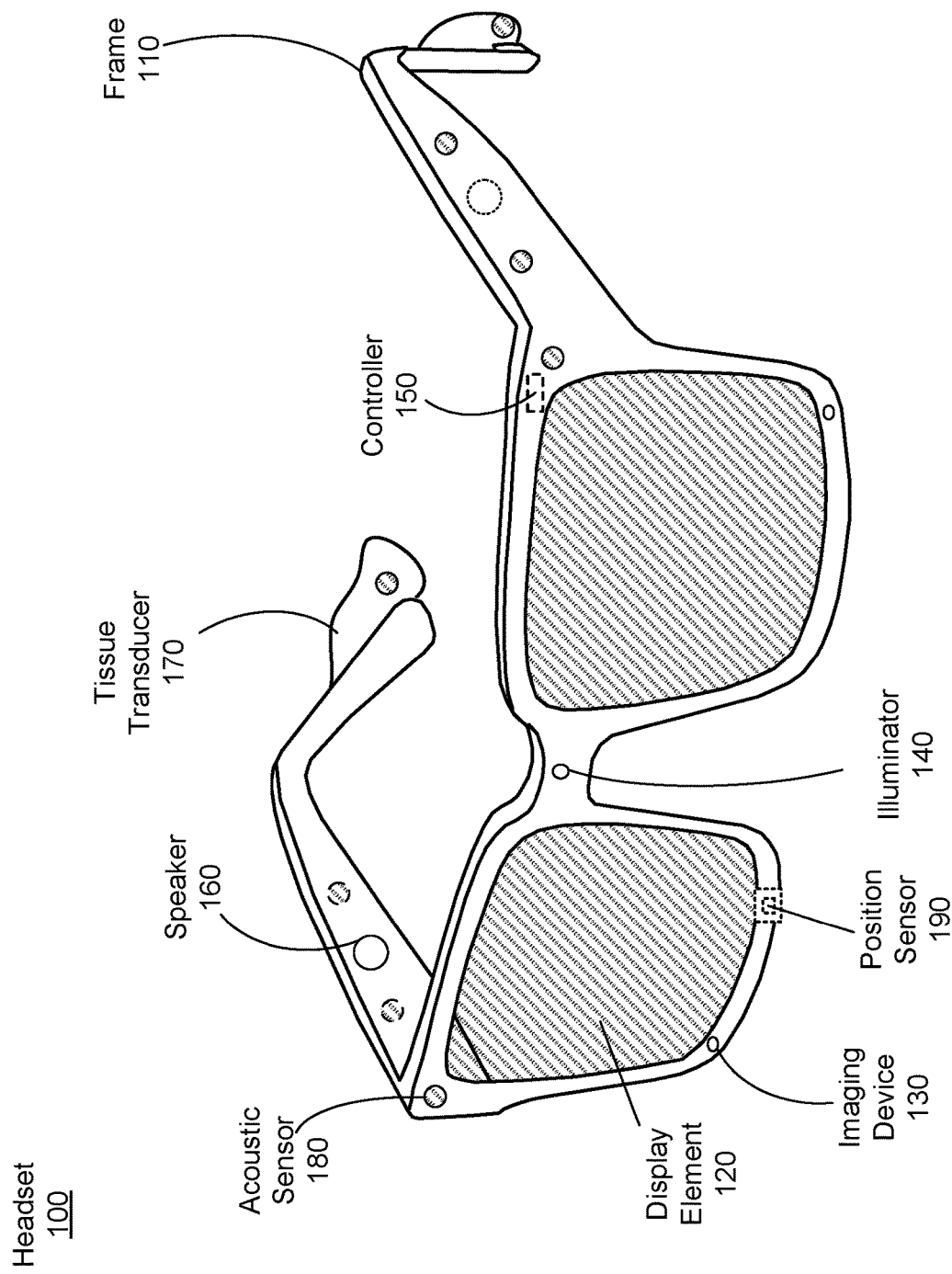
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A controller receives data captured by various sensors and analyzes the received data to estimate a user's hearing loss. In some embodiments, the controller also compensates for the user's estimated hearing loss. In various embodiments, the controller is coupled to one or more acoustic sensors that capture audio from a local area surrounding the controller. Additionally, the controller is coupled to one or more additional sensors that capture other information, including information describing the user, information describing the local area surrounding the controller, or some combination thereof. Examples of additional sensors include imaging devices and a position sensor. In various embodiments, the controller is included in a headset, such as virtual reality (VR) headset or an artificial reality (AR) headset.

Based on information describing a user and information describing the local area from the various sensors, the controller identifies interactions by the user with the local area. An interaction by the user with the local area is a reaction of the user to stimuli (e.g., audio) in the local area. The controller also determines attributes of an identified interaction by the user, with the attributes describing action of the user or conditions in the local area associated with the identified interaction. From one or more identified interactions and associated attributes, the controller estimates a sound profile of a user. The profile identifies hearing loss of the user for different frequencies of audio. For example, one or more identified interactions and associated attributes are input to a trained model that outputs the sound profile for the user. In some embodiments, the sound profile is an audiogram. As another example, the controller maintains associations between combinations of interactions with the local area and attributes and audiograms and selects an audiogram based on the captured audio and information describing the local area. In various embodiments, the user is wearing a headset that includes the controller.

In various embodiments, based on the sound profile determined from the identified interactions by the user with the local area, the controller determines one or more filters for application to subsequent audio. A filter determined by the controller mitigates hearing loss of the user identified by the sound profile estimated for the user. Thus, application of one or more determined filters to subsequent audio modifies the subsequent audio to offset estimated hearing loss of the user in one or more frequency ranges identified by the sound profile estimated for the user.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, a controller 150, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller. However, in other embodiments, the audio system may include different and/or additional components. Similarly, in some cases, functionality described with reference to the components of the audio system can be distributed among the components in a different manner than is described here. For example, some or all of the functions of the audio controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller processes information from the sensor array that describes sounds detected by the sensor array. The audio controller may comprise a processor and a computer-readable storage medium. The audio controller may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The controller 150 controls operation of the headset 100. The controller 150 processes data captured by the various components of the headset 100 to determine a sound profile for the user. The data used to determine the sound profile may include information describing the user, information describing the local area, or some combination thereof. The information describing the user includes audio detected by the sensor array (e.g., one or more acoustic sensors 180). Information describing the local area including the headset 100 may include ambient sounds, image data of the local area, a position of the headset 100 in the local area, other data characterizing the local area, or some combination thereof. The additional sensors may be included in the headset 100, such as imaging device 130 or position sensor 190. Additionally or alternatively, one or more additional sensors are external to the headset 100. For example, an additional sensor is a position sensor included in another wearable device a user wears along with the headset 100 or is another type of sensor included in the other wearable device.

The controller 150 may also process the data captured by the various components to determine information describing the user, information describing the local area, or some combination thereof. For example, the controller 150 may perform eye-tracking analyses on image data captured by an imaging device 130 positioned in view of a user's eyes. As another example, the controller 150 may perform facial expression detection on image data captured by an imaging device 130 positioned in view of a user's face. In yet another example, the controller 150 may determine a position and/or a movement of the headset 100 based on image data captured by an imaging device 130 positioned in view of the local area, position data captured by a position sensor 190, or some combination thereof.

In one or more embodiments, from the audio captured by one or more acoustic sensors 180, as well as other data, the controller 150 identifies interactions by a user of the headset 100 within the local area. As used herein, an interaction by a user is an action taken by the user in response to a stimulus within the local area. For example, the stimulus within the local area is a sound from a sound source, and an interaction by the user is one or more actions by the user performed in response to the sound. Example interactions by the user include generating audio (e.g., speaking), performing a physical gesture, other movement of the user, or lack of movement by the user. As further described below in conjunction with FIGS. 2-4, the controller 150 also identifies attributes associated with each interaction. Attributes associated with an interaction describe characteristics of the local area for an interaction and may describe actions or performed by the user during the interaction. For example, the controller 150 identifies a user's reaction to a sound and determines whether a source of the sound was within a field of view of the headset 100. As another example, the controller 150 determines the user's reaction to a sound and a location of the sound relative to the headset 100. In other embodiments, the controller 150 analyzes audio generated by the user in response to a sound to describe the audio generated by the user. Other example attributes of an interaction include an amplitude of a sound comprising the stimulus to the user, a frequency range of the sound comprising the stimulus to the user, a location of the sound comprising the stimulus to the user relative to the headset 100, or other information describing the sound comprising the stimulus to the user. Thus, the controller 150 determines combinations of an interaction by the user identified by the controller 150 and attributes associated with the identified interaction.

The controller 150 estimates a sound profile of the user from the identified interactions and associated attributes. In some embodiments, the controller 150 applies a model to combinations of identified interactions and associated attributes, with the model outputting a sound profile for a user based on the interactions and associated attributes. The model may further input the stimulus in the local area. In other embodiments, the controller 150 maintains a set of rules that map specific combinations of one or more interactions and associated attributes to different sound profiles or portions of sound profiles. A sound profile describes a level of hearing loss of the user and a configuration of the hearing loss for the user (e.g., frequency bands where the user's hearing is impaired). For example, levels of hearing loss may include 0 (referring to no hearing loss), 1 (referring to mild hearing loss), 2 (referring to medium hearing loss), or 3 (referring to severe hearing loss). Other gradations may be used, e.g., a continuous range. The sound profile may further grade levels of hearing loss for each ear, in different frequency ranges, in different environments, or some combination thereof. In some embodiments, the sound profile also identifies one or more functional impacts of the hearing loss for the user. Example functional impacts of hearing loss include speech intelligibility deficits, or increased listening effort, self-perceived hearing loss. In some embodiments, the sound profile is an audiogram describing the user's hearing as a function of frequencies, allowing identification of the user's hearing loss for different frequency. In other embodiments, the sound profile is answers to a hearing survey, a metric of speech intelligibility, a metric of listening effort, or a combination thereof.

Based on the sound profile, the controller 150 determines one or more filters to apply to audio presented to the user in some embodiments. In some embodiments, the audio controller may be part of the controller 150, e.g., the audio controller may determine one or more of the filters to apply to audio presented. The one or more filters augment the audio, e.g., to compensate for deficiencies in the user's hearing identified by the sound profile. For example, if the sound profile identifies a specific range of frequencies that the user has difficulty hearing, a filter amplifies the specific range of frequencies in audio relative to other frequencies. By applying the one or more determined filters to audio, an audio system generates augmented audio for presentation to the user. The augmented audio is provided to one or more speakers 160 or to one or more tissue transducers 170 for presentation to the user.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 5.

Figure 1B:
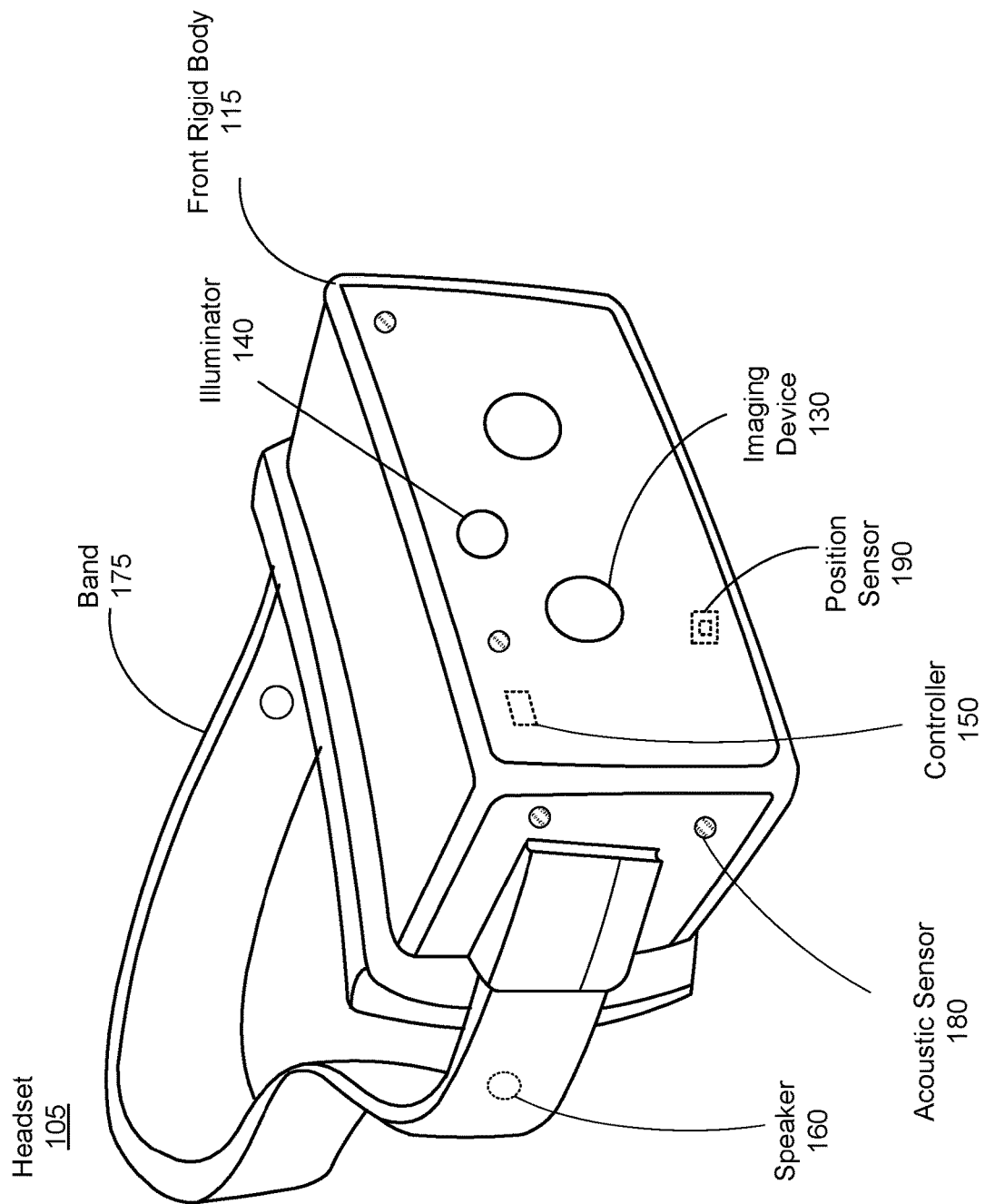
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, a controller 150, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
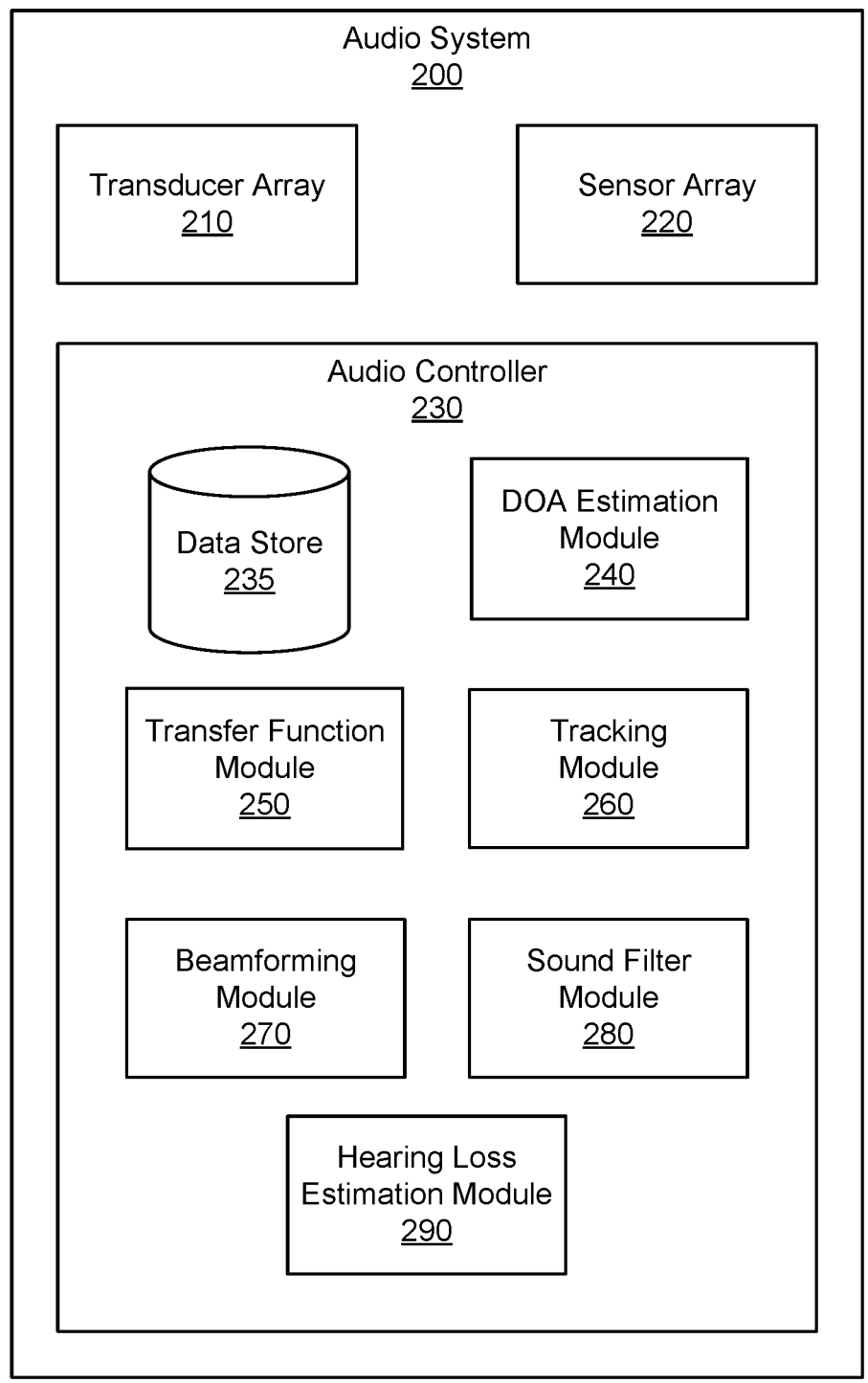
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, a sound filter module 280, and a hearing loss estimation module 290. In one or more embodiments, the audio controller 230 may be part of a controller of a headset (e.g., the controller 150 of the headset 100 and/or the headset 105 in FIGS. 1A and 1B). The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 200, or any combination thereof.

In various embodiments, the data store 235 includes a trained model that outputs a sound profile for a user based on one or more interactions and attributes associated with each of the one or more interactions. Training of the model is further described below. Alternatively or additionally, the data store 235 includes a set of rules associating interactions and attributes of interactions with sound profiles or portions of sound profiles. A rule includes an association between one or more interactions, as well as attributes associated with the one or more interactions, and a sound profile (or a portion of a sound profile). Additionally, the data store 235 includes an association between an identifier of a user and a sound profile estimated for the user, as further described below.

The user may opt-in to allow the data store 235 to record data captured by the audio system 200. In some embodiments, the audio system 200 may employ always on recording, in which the audio system 200 records all sounds captured by the audio system 200 in order to improve the experience for the user. The user may opt in or opt out to allow or prevent the audio system 200 from recording, storing, or transmitting the recorded data to other entities.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 5). As further described below in conjunction with FIGS. 3 and 4, in various embodiments, the sound filter module 280 determines one or more filters to apply to audio based on a sound profile determined for a user by the hearing loss estimation module 290.

The sound filter module 280 provides the sound filters to the transducer array 210. In some embodiments, the sound filters may cause positive or negative amplification of sounds as a function of frequency.

The hearing loss estimation module 290 receives audio captured by the sensor array 220 and may also receive, from additional sensors, other data, including other information describing a user, information describing a local area surrounding the audio system 200, or some combination thereof. The additional sensors may be included in the sensor array 220 in some embodiments. One or more of the additional sensors may be separate from the audio system 200, such as included in one or more separate devices. As further described above in conjunction with FIG. 1A, an additional sensor may be an imaging device 130, a position sensor 190, or other sensor capturing information describing the user or information describing the local area. The hearing loss estimation module 290 identifies interactions by a user of the audio system 200 within the local area (e.g., a user wearing a headset 100 including the audio system 200), where an interaction by a user is an action taken by the user in response to a stimulus within the local area. Examples of interactions by a user are further described below in conjunction with FIG. 3. The hearing loss estimation module 290 identifies attributes of each interaction, which may account for conditions of the local area or actions performed by the user during an interaction, as further described below in conjunction with FIG. 3.

From the identified interactions and attributes associated with the interactions, the hearing loss estimation module 290 estimates a sound profile of the user. In some embodiments, the audio controller 230 applies a model to combinations of identified interactions and associated attributes, with the model outputting a sound profile for a user based on the interactions and associated attributes. The model may be a trained machine-learned model in various embodiments, with the machine-learned model receiving one or more combinations of identified interactions by a user and corresponding attributes and outputting a sound profile for the user. In some embodiments, the model determines an embedding for each combination of identified interaction and attributes and estimates the sound profile based on the determined embeddings. For example, the model is a set of weights comprising parameters used to determine the sound profile corresponding to one or more combinations of interactions and associated attributes, so the weights transform input data received by the model into output data. The weights may be generated through a training process, during which the model is trained based on a set of training examples and labels associated with the training examples. A training example includes combinations of interactions and associated attributes along with a label that is a sound profile associated with the combinations of interactions and associated attributes. The training process for the model may include: applying the model to a training example, generating a score for the model by comparing an output of the model to the label of the training example, and updating weights associated for the model through a back-propagation process based on the score.

In other embodiments, the hearing loss estimation module 290 or the data store 235 maintains a set of rules mapping specific combinations of interactions and associated attributes to a sound profile, or to portions of a sound profile. The sound profile describes a level of hearing loss of the user and a configuration of the hearing loss for the user (e.g., frequency bands where the user's hearing is impaired). In some embodiments, the sound profile is an audiogram describing a user's hearing as a function of frequencies, allowing identification of the user's hearing impairment for different frequencies. In other embodiments, the sound profile is answers to a hearing survey, a metric of speech intelligibility, a metric of listening effort, or a combination thereof.

In some embodiments, the hearing loss estimation module 290 may store the generated sound profile for a user in the data store 235. The sound profile, as noted above, may include a level of hearing loss for the user. In a later time period, the hearing loss estimation module 290 may update the sound profile for the user based on subsequent interactions and attributes thereof using one or more of the techniques described above (e.g., using the trained machine-learned model, using the one or more rule sets, etc.). The hearing loss estimation module 290 may further implement feedback loop(s) based on augmented audio provided to the user. For example, the sound filter module 280 may apply a sound filter generated based on the estimated sound profile to present augmented audio content to the user. The user may interact in such a manner as to inform adjustments to the sound profile and/or the sound filter. For example, if the user is still turning up the volume, then the hearing loss estimation module 290 may infer that the sound profile needs to be further adjusted.

In some embodiments, the hearing loss estimation module 290 may be a component of a more general controller. The controller, via the hearing loss estimation module 290, may receive data including information describing a user, information describing a local area, or some combination hereof, to determine a sound profile for the user. In a first example, the hearing loss estimation module 290 may determine a sound profile at least based on acoustic data of the user, and may further be based on other information describing the user, information describing the local area, or some combination thereof. In a second example, the hearing loss estimation module 290 may determine a sound profile at least based on eye-tracking data of the user, and may further be based on other information describing the user, information describing the local area, or some combination thereof. In a third example, the hearing loss estimation module 290 may determine a sound profile at least based on facial expression data of the user, and may further be based on other information describing the user, information describing the local area, or some combination thereof.

Based on the sound profile, the hearing loss estimation module 290, and/or the sound filter module 280, determines one or more filters to apply to audio presented to the user in various embodiments. In some embodiments, the hearing loss estimation module 290 transmits the sound profile determined for the user to the sound filter module 280, which determines or generates one or more filters based on the sound profile. A filter determined based on the sound profile compensates for deficiencies in the user's hearing identified by the sound profile, as further described below in conjunction with FIG. 3. Hence, the hearing loss estimation module 290, or the sound filter module 280, generates augmented audio for presentation to the user by applying one or more determined filters for the user to the audio prior to presentation to the user. Application of the one or more determined filters augments the audio by amplifying portions of the audio with frequencies within ranges of frequencies where the sound profile identifies hearing loss of the user. This allows the sound profile estimated for a user to enable compensation of the user's hearing loss when subsequently presenting audio to the user.

FIG. 3 is a flowchart of a method for estimating hearing loss of a user of a headset 100, in accordance with one or more embodiments. The process shown in FIG. 3 may be performed by a headset (e.g., the headset 100 and/or the headset 105 in FIGS. 1A & 1B), or may be performed by components of an audio system (e.g., audio system 200). Other entities may perform some or all of the steps in FIG. 3 in other embodiments. Various embodiments may include different and/or additional steps, or perform the steps in different orders.

In various embodiments, a headset 100, such as described above in conjunction with FIGS. 1A and 1B, includes a controller and one or more sensors to capture data. The one or more sensors capture 310 information describing the user, information describing the local area, or some combination thereof. In one or more embodiments, the one or more sensors includes the acoustic sensors 180 that capture audio from the user and/or the local area.

Additionally, one or more additional sensors capture information describing the local area. For example, an additional sensor is an imaging device 130 capturing images or video of the local area within a field of view of the imaging device 130. As another example, an additional sensor is a position sensor 190 that determines movement of a portion of the user in the local area. In some embodiments, the position sensor 190 is in a common device as the controller 150. For example, the controller 150 and the position sensor 190 are included in a headset 100. Alternatively, the position sensor 190 is in a different device than the controller 150. For example, the position sensor 190 is in a wearable device, such as a smartwatch, worn by a user, while the controller 150 is in a headset 100 worn by the user. Different position sensors 190 may be included in different devices having different positions on the user's body, allowing capture of information describing movement or positioning of different portions of the user's body. One or more additional sensors may be included in a device including the controller 150, with other additional sensors included in one or more different devices. In various embodiments, different additional sensors capture different types of information describing the local area, different types of information describing the user, or some combination thereof. The controller 150 receives the various information.

From the captured audio and the information describing the local area, the controller 150 identifies 315 one or more interactions with the local area by the user. An interaction by the user is an action taken by the user in response to a stimulus within the local area. Example interactions by the user include generating audio (e.g., speaking), performing physical gestures, such as moving or repositioning one or more portions of the user's body. In various embodiments, the stimulus within the local area is a sound within the local area, and an interaction is an action by the user to adjust a volume of a source of the sound. For example, the controller 150 identifies 315 an interaction by the user in response to captured audio including words or phrases from the user requesting an increased volume of the sound or in response to detecting an increase in amplitude of the sound after the captured audio includes audio from the user. As another example, an interaction by the user is identified 315 in response to captured audio from the user including words or phrases associated with requests for clarification of content by the controller 150. In another example, the controller 150 identifies 315 an interaction in response to the captured audio not including audio from the user within at least a threshold amount of time after the captured audio included the sound from the local area, indicating a lack of response by the user to the sound.

In other embodiments, the controller 150 identifies 315 an interaction based on indications of social activity by the user. For example, the controller 150 identifies 315 an interaction by the user in response to the information describing the local area including one or more specific gestures or movement by the user. A specific gesture may be movement of a portion of the user's body towards a source of a sound in the local area, a specific movement of a specific portion of the user's body (e.g., the user cupping a hand by the user's ear).

One or more interactions identified 315 by the controller 150 are between the user and one or more other users in the local area. For example, the controller 150 identifies the user is speaking with an additional user based on captured audio including audio from the user and from the additional user. For an interaction with an additional user, the controller 150 identifies a duration that the user and the additional user speak to each other, as well as attributes of audio exchanged between the user and the additional user, as further described below. In some embodiments, the controller 150 determines a number of times the user speaks with additional users in the local area.

When the controller 150 identifies 315 an interaction by the user with a sound source, such as an additional user, the controller 150 identifies attributes of the interaction from captured audio and from information describing the local area. Example attributes of an interaction with an additional user include a level of depth of conversation based on extracted topics from the captured audio and from a duration of captured audio including audio from the user and from the additional user, a category of the additional user (e.g., a friend of the user, a family member of the user, a spouse of the user, a stranger, etc.), an identify of the additional user (determined from captured audio from the additional user, from video including the additional user, from an identifier of a headset 100 of the additional user, etc.), or other information describing an additional user involved in an interaction. As further described below, the controller 150 may process captured audio from the user and an additional user (or other source source) to identify one or more attributes associated with an interaction.

Attributes of an interaction between the user and a sound source, such as an additional user, in the local area include one or more turn-taking metrics for the interaction in some embodiments. Turn-taking metrics describe speaking activity by the user. For example, a turn-taking metric identifies a length of time the user produces audio during the interaction or a length of time a sound source (e.g., an additional user) produces audio during the interaction. As another example, a turn-taking metric identifies a percentage of time the user produces audio during the interaction or a percentage of time the sound source (e.g., additional user) produces audio during the interaction. In another example, a turn-taking metric identifies an amount of time (e.g., an average amount of time, a median amount of time) between the sound source (e.g., additional user) producing audio during an interaction and the user producing audio during the interaction (or vice versa). Additional turn-taking metrics may be determined based on audio production by the user and by a sound source (e.g., an additional user) during an interaction.

In various embodiments, attributes of an interaction between a user and an additional user (or other sound source) include data describing repair initiations. A repair initiation is determined from words or phrases identified within the captured audio where the user requests a repair of the interaction, with a repair indicating a request by the user for clarification of audio from a sound source, such as an additional user. For example, an attribute of an interaction specifies a number of repair initiations by the user during the interaction or a frequency with which repair initiations occurred by the user during the interaction. In various embodiments, the controller 150 identifies repair initiations for an interaction by identifying audio from the user captured during the interaction, extracting words or phrases from audio captured from the user, and comparing the extracted words or phrases to stored data (e.g., phrases, words, syntax) corresponding to repair initiations. The controller 150 identifies a repair initiation when extracted words or phrases match the stored data and uses one or more identified repair initiations to determine one or more attributes of the interaction. The controller 150 may further specify whether a repair initiation is open or closed. A closed repair initiation includes one or more indications that the user is tracking with the topic of the conversation and/or the most recent statement by another user. An open repair initiation lacks any indication that the user is tracking with the topic and/or the most recent statement by another user.

As another example, attributes of an interaction between a user and a sound source include one or more semantic metrics. In various embodiments, a semantic metric is based on a of a topic determined for audio captured from the user. In some embodiments, a semantic metric also accounts for a topic for audio captured from the sound source. In various embodiments, the controller 150 determines a semantic metric of an interaction by applying a natural language model to captured audio from the user, with the natural language model outputting a topic of the captured audio from the user. Additionally, the controller 150 applies the natural language module to captured audio from a sound source (e.g., an additional user) involved in the interaction to determine a topic of the captured audio from the sound source. The semantic metric is determined based on a difference between the topic of the captured audio from the user and the topic of the captured audio from the sound source in various embodiments. For example, the semantic metric is a measure of similarity between the topic of the captured audio from the user and the topic of the captured audio from the sound source. Thus, in various embodiments, the semantic metric represents a measure of similarity between a topic of audio captured from the user and a topic of audio captured from the sound source involved in an interaction, allowing the sematic metric to indicate whether the topic of the user's audio deviates from the topic of the sound source's audio. In various embodiments, the controller 150 determines a sematic metric for different combinations of the user and different sound sources involved in an identified interaction. In other embodiments, the controller 150 determines a semantic metric between a topic determined for audio captured from the user and a baseline value or topic.

The controller 150 may further learn particularities of a user's speech. The controller 150 may apply a natural language processing model to extract the particularities of the user's speech. Example particularities may include word choice, grammar tendencies, inflections in the user's speech, an accent of the user, etc. Such particularities may be attributes of the user's interaction, namely the user's speech, which may be used when determining the sound profile of the user.

Further, the controller 150 determines attributes of the local area from the information describing the local area and from the captured audio when an interaction is identified 315. For example, an attribute of the local area is an amount of ambient or background noise in the local area when an interaction is identified 315. The controller 150 may identify a type or a category of the local area when an interaction is identified 315 based on video of the local area or location information from a position sensor 190. Other characteristics of the local area when an interaction is identified 315 may additionally or alternatively be determined from the information describing the local area.

When an interaction by the user with a sound source is identified 315, the controller 150 determines an attribute indicating whether the sound source is within a field of view of the user. For example, one or more imaging devices 130 are positioned on a headset 100 (or on another device) to have fields of view that at least partially overlap with a field of view of the user. The controller 130 determines whether a location of a sound source in an interaction is within a field of view of an imaging device 130 having a field of view that overlaps with the user's field of view as an attribute associated with the interaction. This allows the audio controller 130 to determine whether the sound source involved in an interaction was visible to the user during the interaction. In various embodiments, the controller 150 stores a visibility indication in association with an identified interaction, with the visibility indication having a first value in response to the sound source being within a field of view of an imaging device 130 that overlaps with the user's field of view and having a second value in response to the sound source not being within a field of view of an imaging device 130 that overlaps with the user's field of view.

In some embodiments, the controller 150 determines an attribute associated with an interaction as a location of a sound source involved in the interaction relative to the controller 150 based on a direction of arrival of captured audio, as further described above in conjunction with FIG. 2. The location of the sound source relative to the controller 150 is used as a proxy for the location of the sound source relative to the user, allowing the controller 150 to identify a location of a sound source relative to the user for an identified interaction. The controller 150 stores the location of a source relative to the controller 150 in association with an identified interaction, allowing an identified interaction to account for a location of a sound source in the identified interaction relative to the controller 150 (representing the location of the sound source relative to the user).

Based on the identified interactions and attributes associated with identified interactions, the controller 150 estimates 320 a sound profile of the user. In some embodiments, the controller 150 applies a model to combinations of identified interactions and associated attributes. As further described above in conjunction with FIG. 2, the model outputs a sound profile for the user based on the identified interactions and their associated attributes. The model is a trained machine-learned model in various embodiments, with the machine-learned model receiving one or more combinations of identified interactions and associated attributes as inputs and outputting the sound profile for the user. The model is a set of weights comprising parameters used to determine the sound profile corresponding to one or more combinations of interactions and associated attributes, with the weights generated through a training process where the model is applied to a set of training examples and labels associated with the training examples. A training example includes combinations of interactions and associated attributes along with a label that is a sound profile associated with the combinations of interactions and associated attributes.

In various embodiments, the training process for the model comprises applying the model to each training example of a set of training examples. Application of the model to a training example outputs a sound profile based on the one or more interactions and associated attributes. Based on the sound profile output by the model for a training example and a label of the training example, the controller 150 scores the model. The score is based on a difference between the sound profile output by the model and the label applied to the training example. In various embodiments, the controller 150 generates the score for the model based on a loss function. The loss function is a function that generates a score for the model so the score is higher when the model performs poorly and lower when the model performs well. In various embodiments, the loss function is based on a difference between the sound profile output by the model and a label applied to the training example. Example loss functions include a mean square error function, a mean absolute error, a hinge loss function, and a cross entropy loss function.

The controller 150 updates the set of parameters for the model based on the score generated by the loss function. For example, the controller 150 updates one or more parameters (e.g., weights) comprising the model through backpropagation based on the score from application of the model to a training example. The controller 150 may update one or more parameters comprising the model until one or more criteria are satisfied. For example, the controller 150 modifies the parameters until a value of the loss function is less than a threshold value. After training the model, application of the model to the identified interactions and associated attributes estimates 320 a sound profile for the user.

In other embodiments, the controller 150 maintains a set of rules, with each rule mapping a combination of one or more identified interactions and associated attributes to portions of a sound profile. Different rules map different combinations of identified interactions and associated attributes to different portions of a sound profile or to different sound profiles. For example, a rule maps a combination of an interaction with attributes indicating difficulty by the user in perceiving audio from a sound source a indicating at least a threshold level of background noise during the interaction along with an additional interaction with attributes indicating no difficulty by the user in perceiving audio from the sound source and indicating less than the threshold level of background noise during the additional interaction with a sound profile indicating hearing loss for audio having greater than a threshold frequency. In another example, a rule maps a combination of an interaction with attributes indicating difficulty by the user in perceiving audio from a sound source a indicating at least a threshold level of background noise during the interaction along with an additional interaction with attributes indicating difficulty by the user in perceiving audio from the sound source and indicating less than the threshold level of background noise during the additional interaction with a sound profile indicating hearing loss for audio having greater than an alternative threshold frequency that is lower than the threshold frequency in the preceding example. As another example, a rule maps a combination of an interaction associated with attributes indicating difficulty by the user in perceiving audio from a sound source and less than a threshold level of background noise during the interaction to a sound profile indicating hearing loss for audio having a range of frequencies having an upper threshold frequency and a lower threshold frequency. In an additional example, a rule maps an interaction associated with attributes indicating difficulty by the user in perceiving audio from a sound source and indicating the sound source was not in a field of view of the user with a sound profile to a sound profile indicating hearing loss for audio having a range of frequencies having an upper threshold frequency and a lower threshold frequency. In another example, a rule maps an interaction associated with attributes indicating no response by the user to audio from a sound source and indicating the sound source was not in a field of view of the user with a sound profile to a sound profile indicating hearing loss for audio across a broader range of frequencies between a minimum frequency and a maximum frequency.

The sound profile describes a level of hearing loss of the user and a configuration of the hearing loss for the user (e.g., frequency bands or ranges where the user's hearing is impaired). In some embodiments, the sound profile also identifies one or more functional impacts of the hearing loss for the user. Example functional impacts of hearing loss include speech intelligibility deficits, increased listening effort, self-perceived hearing loss. In some embodiments, the sound profile is an audiogram describing a user's hearing as a function of frequencies, allowing identification of the user's hearing loss for different frequencies. In other embodiments, the sound profile is answers to a hearing survey, a metric of speech intelligibility, a measure of listening effort, or a combination thereof. Thus, estimating 320 the sound profile of the enables the controller 150 to estimate hearing loss of the user and the user's hearing loss for different frequencies from the identified interactions by the user and their associated attributes, rather than based on the user's answers to specific questions or measuring the user's hearing response to different sounds presented to the user. This simplifies estimation of the user's hearing loss, while providing increased information about the user's hearing loss in a wider range of scenarios than those encompassed by conventional hearing tests.

The controller 150 may store the sound profile estimated 320 for the user in association with a user identifier of the user. In some embodiments, the controller 150 stores the sound profile in association with an identifier of the user in a data store (e.g., the data store 235 of the audio system 200). Additionally or alternatively, the controller 150 communicates the sound profile and identifier of the user to an external device, such as a mapping server 525, further described in conjunction with FIG. 5, or other server.

In various embodiments, in addition to estimating 320 the sound profile for the user identifying hearing loss of the user, the controller 150 modifies subsequent audio for presentation to the user to mitigate hearing loss identified by the sound profile. To compensate for hearing loss identified by the sound profile, the controller 150 determines 325 one or more filters to apply to subsequent audio presented to the user. In some embodiments, the controller 150 identifies a range of frequencies where the user has hearing loss from the sound profile and determines 325 a filter that amplifies the identified range of frequencies relative to other frequencies. So, the determined filter amplifies audio in a range of frequencies where the user was determined to have hearing loss. In various embodiments, different filters determined 325 by the controller 150 correspond to different ranges of frequencies, so the controller 150 determines 325 a filter corresponding to each range of frequencies where the sound profile identified the user has hearing loss. In some embodiments, the audio controller 230 of FIG. 2 determines the one or more filters based on the sound profile. In other embodiments, the controller 150 includes the audio controller 230, which may leverage the sound filter module 280 to obtain the sound profile for the user and determine 325 the one or more filters from the sound profile. The controller 150 stores the one or more determined filters in association with a user identifier of the user in some embodiments, expediting subsequent retrieval of the determined filters for the user.

After determining 325 the one or more filters, when audio is to be presented to the user, the controller 150 generates 330 augmented audio by applying the one or more filters to audio for presentation to the user. Application of the one or more filters amplifies portions of the audio with frequencies within ranges where the sound profile identifies hearing loss for the user relative to other frequencies. Thus, the augmented audio increases amplitudes of frequencies of audio for which the sound profile indicated the user experienced hearing loss.

The controller 150 presents 335 the augmented audio to the user. For example, the controller 150 plays the augmented audio through the transducer array 205. As an example, a speaker 160 or a transducer 170 receives the augmented audio from the controller 150 and plays the augmented audio to the user. As the augmented audio amplifies audio with frequencies for which the sound profile indicated the user had hearing loss, the augmented audio compensates for the user's hearing loss. This allows the user to more clearly hear the augmented audio by the controller 150 leveraging the sound profile estimated 320 from the identified interactions by the user in the local area.

Figure 4:
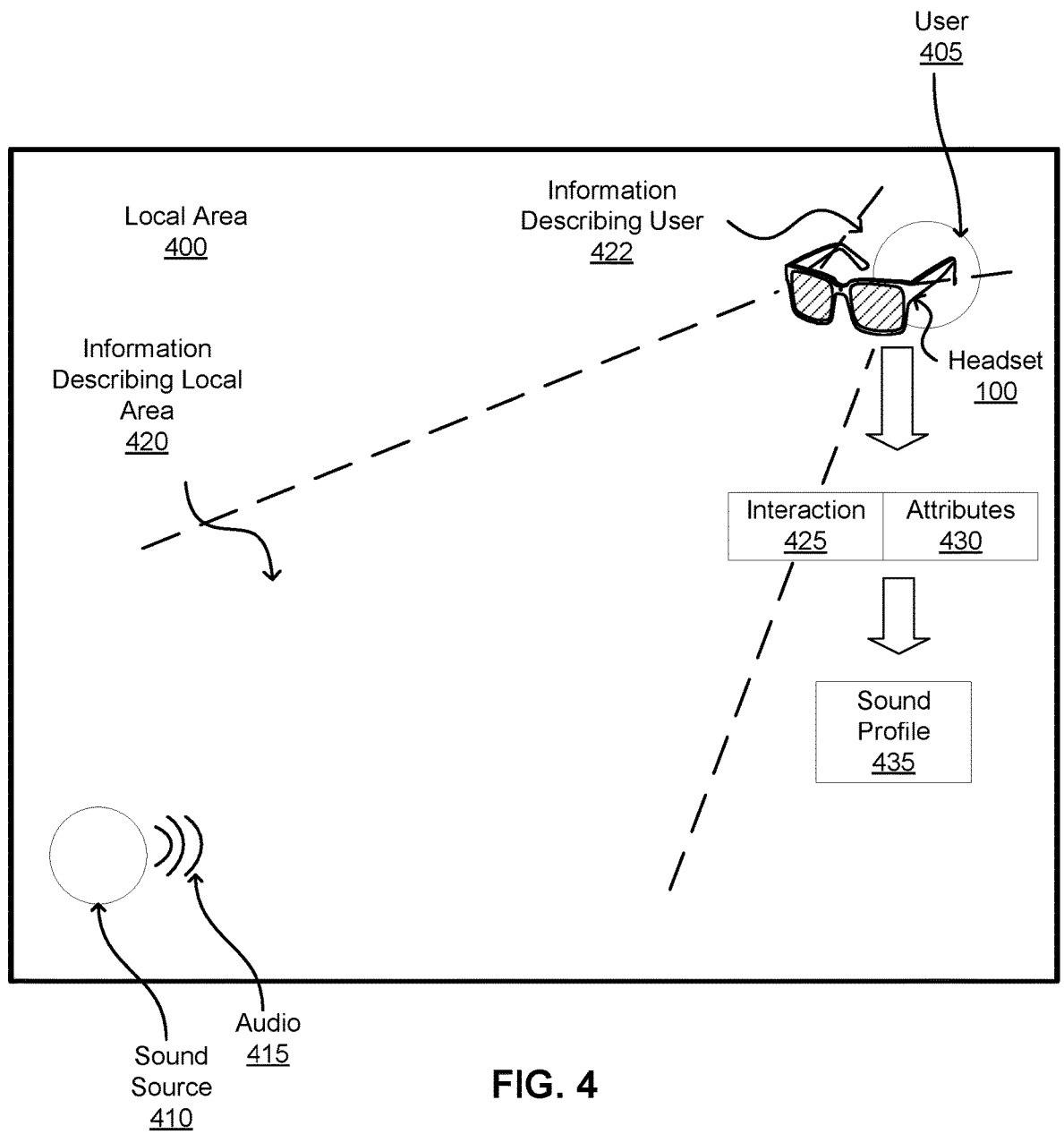
FIG. 4 is a conceptual diagram of a headset determining a sound profile for a user based on audio captured from a local area and information describing the local area, in accordance with one or more embodiments.

FIG. 4 is a conceptual diagram of a headset 100 determining a sound profile 435 for a user 405 based on information describing a local area 420, information describing a user 422, or some combination thereof. The information describing the user 422 may include, among other things described throughout this disclosure, audio captured of the user. The information describing the local area 420 may include, among other things described throughout this disclosure, audio captured from a local area and information describing the local area. As shown in FIG. 4, a user 405 wears a headset 100, as further described above in conjunction with FIG. 1A, including an controller 150. In other embodiments, the controller 150 is included in a different device.

The headset 100 includes one or more acoustic sensors 180 configured to capture audio within the local area 400, as information describing the local area 420. Alternatively or additionally, one or more acoustic sensors are separate from the headset 100 and capture audio within the local area 400 that is communicated to the controller 150. In the example of FIG. 4, the local area 400 includes a sound source 410 that emits audio 415 into the local area 400. For example, the sound source 410 is a person, such as another user of another headset 100. As another example, the sound source 410 is a device, such as a television, a mobile device, or other device capable of emitting audio. The one or more acoustic sensors 180 capture the audio 415 from the local area 400.

Additionally, the headset 100 includes one or more additional sensors, such as imaging devices 130 or a position sensor 190. In some embodiments, one or more additional sensors are separate from the headset 100 and communicatively coupled to the headset 100. For example, a position sensor 190 in a wearable device on a portion of the body of the user 405 is communicatively coupled to the headset 100. The one or more additional sensors capture information describing the local area 420, information describing the user 422, or some combination hereof. As further described above in conjunction with FIG. 3, examples of information describing the local area 420 may include video of the local area 400, a position of the headset 100 in the local area 400, a position of a portion of the user's body in the local area 400, or other data describing the local area 400 or the user's movement in the local area 400. As described elsewhere throughout this disclosure, the information describing the user 422 may include audio captured of the user 405, eye tracking information, facial expression information, or movement of the head (or another body part) of the user 405.

As further described above in conjunction with FIG. 3, based on the information describing the local area 420, the information describing the user 422, or some combination thereof, the controller 150 of the headset 100 identifies one or more interactions by the user 405 with the local area 400 and attributes 430 associated with each identified interaction. In the example of FIG. 4, the controller 150 identifies interaction 425 from the audio 415 and from the information 420 describing the local are 400 and identifies attributes 430 corresponding to the interaction 425. As further described above in conjunction with FIG. 3, interaction 425 represents an action taken by the user 405 in response to a stimulus within the local area 400. In the example of FIG. 4, interaction 425 represents an action taken by the user 405 in response to the audio 415 from the sound source 410. As further described above in conjunction with FIG. 3, the controller 150 identifies interaction 425 based on movement of the user 405 in the local area, captured audio from the user after the audio 415 from the source 410 was captured, other data from the one or more acoustic sensors 180 or one or more additional sensors, or any combination thereof. The controller 150 may identify any number of interactions by the user 405 with the local area in various embodiments.

Additionally, the controller 150 determines attributes 430 associated with the interaction 425, allowing the controller 150 to account for conditions within the local area 400 or actions by the user when the interaction 425 was identified. As further described above in conjunction with FIG. 3, the attributes 430 describe the local area 400, information about the user 405, information about actions performed by the user during the interaction 425, or a combination thereof. Example attributes 430 include a level of background noise in the local area, a location of the source 410 relative to the headset 100, an indication whether the source 410 is in a field of view of the headset 100, or other information describing conditions within the local area 400. Other example attributes 430 include a duration that the user 405 interacts with the sound source 410, a number of times the user 405 speaks with the sound source 410, an indication whether the user 405 comprehends the audio 415 from the source 410, or other information describing the user's reaction to the audio 415 from the sound source 410.

From the interaction 425 and the associated attributes 430, the controller 150 estimates a sound profile 435 for the user 405. As further described above in conjunction with FIG. 3, the controller 150 applies a trained model to the interaction 425 and the associated attributes 430, with the model outputting the sound profile 435 based on the interaction 425 and associated attributes 430. In other embodiments, the controller 150 estimates the sound profile or one or more portions of the sound profile 435 based on a set of rules that each associate a combination of one or more interactions 425 and their associated attributes 430 with one or more portions of a sound profile 435. This allows the controller 150 to leverage identified interactions 425 by the user 405 with the local area 400 and associated attributes 430 to estimate a sound profile 435 describing a level of hearing loss of the user 400 and a configuration of the hearing loss for the user 405 (e.g., frequency bands where the user's hearing is impaired). For example, the sound profile 435 identifies a level of hearing loss for the user 405 for different frequencies or identifies one or more ranges of frequencies of audio where the user 405 has at least a threshold amount of hearing loss.

As further described above in conjunction with FIG. 3, in various embodiments, the controller 150 leverages the sound profile 435 to determine one or more filters to apply to audio for subsequent presentation to the user 405. The one or more filters increase an amplitude of audio with frequencies in ranges identified by the sound profile 435 as ranges where the user 405 experienced hearing loss. Application of the one or more filters to audio generates augmented audio that increases amplitudes of portions of the audio having frequencies where the user 405 has hearing loss indicated by the sound profile 435, allowing the augmented audio to mitigate the user's hearing loss and increase a likelihood of the user understanding the augmented audio relative to the audio without application of the one or more filters.

Figure 5:
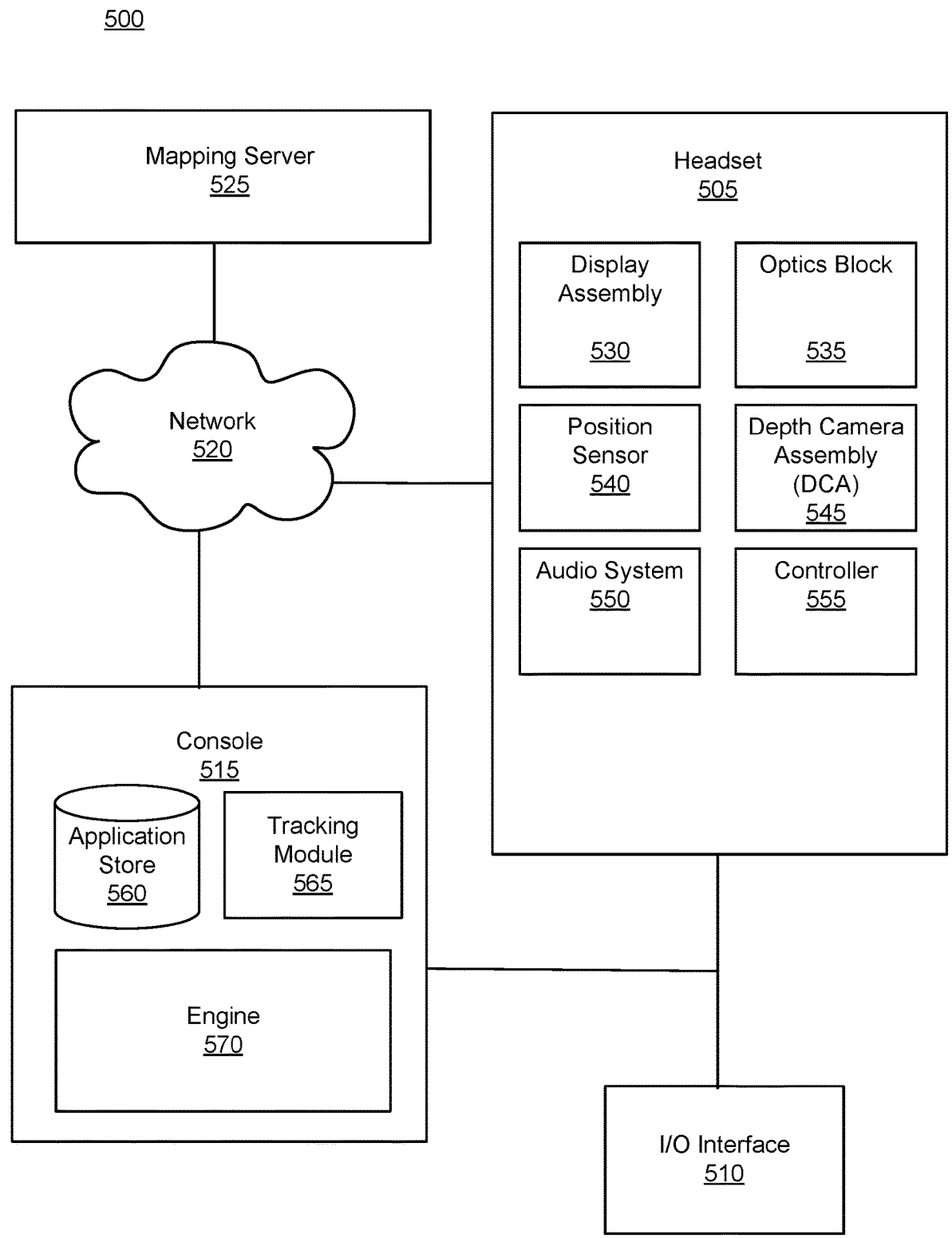
FIG. 5 is a system that includes a headset, in accordance with one or more embodiments.

FIG. 5 is a system 500 that includes a headset 505, in accordance with one or more embodiments. In some embodiments, the headset 505 may be the headset 100 of FIG. 1A or the headset 105 of FIG. 1B. The system 500 may operate in an artificial reality environment (e.g., a virtual reality environment, an augmented reality environment, a mixed reality environment, or some combination thereof). The system 500 shown by FIG. 5 includes the headset 505, an input/output (I/O) interface 510 that is coupled to a console 515, the network 520, and the mapping server 525. While FIG. 5 shows an example system 500 including one headset 505 and one I/O interface 510, in other embodiments any number of these components may be included in the system 500. For example, there may be multiple headsets each having an associated I/O interface 510, with each headset and I/O interface 510 communicating with the console 515. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 515 may be provided by the headset 505.

The headset 505 includes the display assembly 530, an optics block 535, one or more position sensors 540, a DCA 545, an audio system 550, and a controller 555. Some embodiments of headset 505 have different components than those described in conjunction with FIG. 5. Additionally, the functionality provided by various components described in conjunction with FIG. 5 may be differently distributed among the components of the headset 505 in other embodiments, or be captured in separate assemblies remote from the headset 505.

The display assembly 530 displays content to the user in accordance with data received from the console 515. The display assembly 530 displays the content using one or more display elements (e.g., the display elements 120). A display element may be, e.g., an electronic display. In various embodiments, the display assembly 530 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 535.

The optics block 535 may magnify image light received from the electronic display, corrects optical errors associated with the image light, and presents the corrected image light to one or both eyeboxes of the headset 505. In various embodiments, the optics block 535 includes one or more optical elements. Example optical elements included in the optics block 535 include: an aperture, a Fresnel lens, a convex lens, a concave lens, a filter, a reflecting surface, or any other suitable optical element that affects image light. Moreover, the optics block 535 may include combinations of different optical elements. In some embodiments, one or more of the optical elements in the optics block 535 may have one or more coatings, such as partially reflective or anti-reflective coatings.

Magnification and focusing of the image light by the optics block 535 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 535 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 535 corrects the distortion when it receives image light from the electronic display generated based on the content.

The position sensor 540 is an electronic device that generates data indicating a position of the headset 505. The position sensor 540 generates one or more measurement signals in response to motion of the headset 505. The position sensor 190 is an embodiment of the position sensor 540. Examples of a position sensor 540 include: one or more IMUs, one or more accelerometers, one or more gyroscopes, one or more magnetometers, another suitable type of sensor that detects motion, or some combination thereof. The position sensor 540 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 505 from the sampled data. For example, the IMU integrates the measurement signals received from the accelerometers over time to estimate a velocity vector and integrates the velocity vector over time to determine an estimated position of a reference point on the headset 505. The reference point is a point that may be used to describe the position of the headset 505. While the reference point may generally be defined as a point in space, however, in practice the reference point is defined as a point within the headset 505.

The DCA 545 generates depth information for a portion of the local area. The DCA includes one or more imaging devices and a DCA controller. The DCA 545 may also include an illuminator. Operation and structure of the DCA 545 is described above with regard to FIG. 1A.

The audio system 550 provides audio content to a user of the headset 505. The audio system 550 is an embodiment of the audio system 200 described above. The audio system 550 may comprise one or acoustic sensors, one or more transducers, and an audio controller. The audio system 550 may provide spatialized audio content to the user. In some embodiments, the audio system 550 may request acoustic parameters from the mapping server 525 over the network 520. The acoustic parameters describe one or more acoustic properties (e.g., room impulse response, a reverberation time, a reverberation level, etc.) of the local area. The audio system 550 may provide information describing at least a portion of the local area from e.g., the DCA 545 and/or location information for the headset 505 from the position sensor 540. The audio system 550 may generate one or more sound filters using one or more of the acoustic parameters received from the mapping server 525, and use the sound filters to provide audio content to the user.

The controller 555 controls operation of the various components of the headset 505. In one or more embodiments, the controller 555 performs hearing loss estimation.

Hearing loss estimation entails estimating a sound profile, describing a level of hearing loss of a user, based on data including information describing the user, information describing the local area, or some combination thereof. The controller 555 may estimate the sound profile by determining one or more interactions of the user and attributes of the interactions based on the data. The interactions and attributes may be input into a trained model, or otherwise applied to a set of rules to estimate the sound profile. The controller 555 (or the audio system 550) may generate one or more sound filters based on the sound profile to augment audio content to be presented to the user. In some embodiments, the one or more filters include a determined filter increasing an amplitude of audio in a frequency range where the sound profile indicates the user experiences hearing loss.

The I/O interface 510 is a device that allows a user to send action requests and receive responses from the console 515. An action request is a request to perform a particular action. For example, an action request may be an instruction to start or end capture of image or video data, or an instruction to perform a particular action within an application. The I/O interface 510 may include one or more input devices. Example input devices include: a keyboard, a mouse, a game controller, or any other suitable device for receiving action requests and communicating the action requests to the console 515. An action request received by the I/O interface 510 is communicated to the console 515, which performs an action corresponding to the action request. In some embodiments, the I/O interface 510 includes an IMU that captures calibration data indicating an estimated position of the I/O interface 510 relative to an initial position of the I/O interface 510. In some embodiments, the I/O interface 510 may provide haptic feedback to the user in accordance with instructions received from the console 515. For example, haptic feedback is provided when an action request is received, or the console 515 communicates instructions to the I/O interface 510 causing the I/O interface 510 to generate haptic feedback when the console 515 performs an action.

The console 515 provides content to the headset 505 for processing in accordance with information received from one or more of: the DCA 545, the headset 505, and the I/O interface 510. In the example shown in FIG. 5, the console 515 includes an application store 560, a tracking module 565, and an engine 570. Some embodiments of the console 515 have different modules or components than those described in conjunction with FIG. 5. Similarly, the functions further described below may be distributed among components of the console 515 in a different manner than described in conjunction with FIG. 5. In some embodiments, the functionality discussed herein with respect to the console 515 may be implemented in the headset 505, or a remote system.

The application store 560 stores one or more applications for execution by the console 515. An application is a group of instructions, that when executed by a processor, generates content for presentation to the user. Content generated by an application may be in response to inputs received from the user via movement of the headset 505 or the I/O interface 510. Examples of applications include: gaming applications, conferencing applications, video playback applications, or other suitable applications.

The tracking module 565 tracks movements of the headset 505 or of the I/O interface 510 using information from the DCA 545, the one or more position sensors 540, or some combination thereof. For example, the tracking module 565 determines a position of a reference point of the headset 505 in a mapping of a local area based on information from the headset 505. The tracking module 565 may also determine positions of an object or virtual object. Additionally, in some embodiments, the tracking module 565 may use portions of data indicating a position of the headset 505 from the position sensor 540 as well as representations of the local area from the DCA 545 to predict a future location of the headset 505. The tracking module 565 provides the estimated or predicted future position of the headset 505 or the I/O interface 510 to the engine 570.

The engine 570 executes applications and receives position information, acceleration information, velocity information, predicted future positions, or some combination thereof, of the headset 505 from the tracking module 565. Based on the received information, the engine 570 determines content to provide to the headset 505 for presentation to the user. For example, if the received information indicates that the user has looked to the left, the engine 570 generates content for the headset 505 that mirrors the user's movement in a virtual local area or in a local area augmenting the local area with additional content. Additionally, the engine 570 performs an action within an application executing on the console 515 in response to an action request received from the I/O interface 510 and provides feedback to the user that the action was performed. The provided feedback may be visual or audible feedback via the headset 505 or haptic feedback via the I/O interface 510.

The network 520 couples the headset 505 and/or the console 515 to the mapping server 525. The network 520 may include any combination of local area and/or wide area networks using both wireless and/or wired communication systems. For example, the network 520 may include the Internet, as well as mobile telephone networks. In one embodiment, the network 520 uses standard communications technologies and/or protocols. Hence, the network 520 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 520 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 520 can be represented using technologies and/or formats including image data in binary form (e.g., Portable Network Graphics (PNG), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 525 may include a database that stores a virtual model describing a plurality of spaces, wherein one location in the virtual model corresponds to a current configuration of a local area of the headset 505. The mapping server 525 receives, from the headset 505 via the network 520, information describing at least a portion of the local area and/or location information for the local area. The user may adjust privacy settings to allow or prevent the headset 505 from transmitting information to the mapping server 525. The mapping server 525 determines, based on the received information and/or location information, a location in the virtual model that is associated with the local area of the headset 505. The mapping server 525 determines (e.g., retrieves) one or more acoustic parameters associated with the local area, based in part on the determined location in the virtual model and any acoustic parameters associated with the determined location. The mapping server 525 may transmit the location of the local area and any values of acoustic parameters associated with the local area to the headset 505.

One or more components of system 500 may contain a privacy module that stores one or more privacy settings for user data elements. The user data elements describe the user or the headset 505. For example, the user data elements may describe a physical characteristic of the user, an action performed by the user, a location of the user of the headset 505, a location of the headset 505, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 500 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   capturing audio from a local area surrounding an audio controller, included in a device worn by a user, using one or more acoustic sensors of the device;
   capturing information describing the local area from one or more additional sensors of the device;
   identifying, by the audio controller, one or more interactions with the local area by the user based on the captured audio and the information describing the local area; and
   estimating a sound profile of the user from the identified one or more interactions and attributes associated with the one or more interactions, the sound profile identifying hearing loss of the user for one or more ranges of frequencies.

2. The method of claim 1, further comprising:
   determining one or more filters to apply to audio for presentation to the user based on the sound profile;
   generating augmented audio by applying the one or more filters to the audio for presentation to the user, the augmented audio increasing an amplitude of a portion of the audio having frequencies within a range of frequencies for which the sound profile identifies hearing loss; and
   presenting the augmented audio to the user through one or more transducers.

3. The method of claim 1, wherein estimating the sound profile of the user from the identified one or more interactions and attributes associated with the one or more interactions comprises:
   applying a model to the identified one or more interactions and attributes associated with the one or more interactions, the model outputting the sound profiles based on the identified one or more interactions and attributes associated with the one or more interactions.

4. The method of claim 1, wherein an attribute associated with an interaction is an indication whether a sound source providing audio during the interaction is within a field of view of an imaging device that overlaps with a field of view of the user.

5. The method of claim 1, wherein the attribute associated with an interaction is a location of a sound source providing audio during the interaction relative to the audio controller.

6. The method of claim 1, wherein an attribute associated with an interaction includes data describing repair initiations by the user during the interaction, a repair initiation indicating initiation of a request for clarification of audio from a sound source providing audio during the interaction.

7. The method of claim 1, wherein an attribute associated with an interaction includes one or more turn-taking metrics for the interaction, a turn-taking metric describing speaking activity by the user during the interaction.

8. The method of claim 7, wherein the turn-taking metric is selected from a group consisting of: a length of time the user produces audio during the interaction, a percentage of time the user produces audio during the interaction, an amount of time between a sound source providing audio during the interaction and the user providing audio during the interaction, and any combination thereof.

9. The method of claim 1 wherein an attribute associated with an interaction includes a semantic metric based on a of a topic determined for captured audio from the user during the interaction.

10. A computer program product comprising a non-transitory computer-readable storage medium having instructions encoded thereon that, when executed by a processor, cause the processor to:
    capture audio from a local area surrounding an audio controller, included in a device worn by a user, using one or more acoustic sensors of the device;
    capture information describing the local area from one or more additional sensors of the device;
    identify, by the audio controller, one or more interactions with the local area by the user based on the captured audio and the information describing the local area; and
    estimate a sound profile of the user from the identified one or more interactions and attributes associated with the one or more interactions, the sound profile identifying hearing loss of the user for one or more ranges of frequencies.

11. The computer program product of claim 10, wherein the non-transitory computer-readable storage medium further has instructions encoded thereon that, when executed by the processor, cause the processor to:
    determine one or more filters to apply to audio for presentation to the user based on the sound profile;
    generate augmented audio by applying the one or more filters to the audio for presentation to the user, the augmented audio increasing an amplitude of a portion of the audio having frequencies within a range of frequencies for which the sound profile identifies hearing loss; and
    present the augmented audio to the user through one or more transducers.

12. The computer program product of claim 10, wherein estimate the sound profile of the user from the identified one or more interactions and attributes associated with the one or more interactions comprises:
    apply a model to the identified one or more interactions and attributes associated with the one or more interactions, the model outputting the sound profiles based on the identified one or more interactions and attributes associated with the one or more interactions.

13. The computer program product of claim 10, wherein an attribute associated with an interaction is an indication whether a sound source providing audio during the interaction is within a field of view of an imaging device that overlaps with a field of view of the user.

14. The computer program product of claim 10, wherein an attribute associated with an interaction is a location of a sound source providing audio during the interaction relative to the audio controller.

15. The computer program product of claim 10, wherein an attribute associated with an interaction includes data describing repair initiations by the user during the interaction, a repair initiation indicating initiation of a request for clarification of audio from a sound source providing audio during the interaction.

16. The computer program product of claim 10, wherein an attribute associated with an interaction includes one or more turn-taking metrics for the interaction, a turn-taking metric describing speaking activity by the user during the interaction.

17. The computer program product of claim 16, wherein the turn-taking metric is selected from a group consisting of: a length of time the user produces audio during the interaction, a percentage of time the user produces audio during the interaction, an amount of time between a sound source providing audio during the interaction and the user providing audio during the interaction, and any combination thereof.

18. The computer program product of claim 10, wherein an attribute associated with an interaction includes a semantic metric based on a of a topic determined for captured audio from the user during the interaction.

19. A headset comprising:
- a frame;
- one or more display elements coupled to the frame, each display element configured to generate image light for presentation to a user wearing the headset;
- one or more acoustic sensors configured to capture audio from a local area surrounding the headset;
- one or more additional sensors configured to capture information describing the local area surrounding the headset; and
- an audio controller including a processor and a non-transitory computer readable storage medium having instructions encoded thereon that, when executed by the processor, cause the processor to:
  - identify, by the audio controller, one or more interactions with the local area by a user based on the captured audio and the information describing the local area; and
  - estimate a sound profile of the user from the identified one or more interactions and attributes associated with the one or more interactions, the sound profile identifying hearing loss of the user for one or more ranges of frequencies.

20. The headset of claim 19, further comprising a transducer array for presenting audio to a user, and wherein the audio controller further includes instructions encoded thereon that, when executed by the processor, cause the processor to:
- determine one or more filters to apply to audio for presentation to the user based on the sound profile;
- generate augmented audio by applying the one or more filters to the audio for presentation to the user, the augmented audio increasing an amplitude of a portion of the audio having frequencies within a range of frequencies for which the sound profile identifies hearing loss; and
- present the augmented audio to the user through one or more transducers.

* * * * *